O. A. MYGATT.
METHOD OF MAKING PRESSED GLASS ARTICLES.
APPLICATION FILED MAR. 21, 1903.

925,824.

Patented June 22, 1909.

Witnesses
Chas. K. Davies.
M. E. Brown

Inventor
O. A. Mygatt.
W. A. Bartlett
Attorney

UNITED STATES PATENT OFFICE.

OTIS A. MYGATT, OF NEW YORK, N. Y.

METHOD OF MAKING PRESSED-GLASS ARTICLES.

No. 925,824.

Specification of Letters Patent.

Patented June 22, 1909.

Application filed March 21, 1903. Serial No. 148,870.

*To all whom it may concern:*

Be it known that I, OTIS A. MYGATT, citizen of the United States, residing at New York, in the county of New York and State of New York, have invented certain new and useful Improvements in Methods of Making Pressed-Glass Articles, of which the following is a specification.

This invention relates to a method of making pressed glass articles.

The object of the invention is to shorten the distance which the plastic glass must flow under the action of a plunger in a molding press, whereby a lesser quantity of material is necessary, and whereby thinner articles with more sharply defined surfaces may be produced.

The invention consists in certain manipulations and operations, as will be explained.

Figure 1:
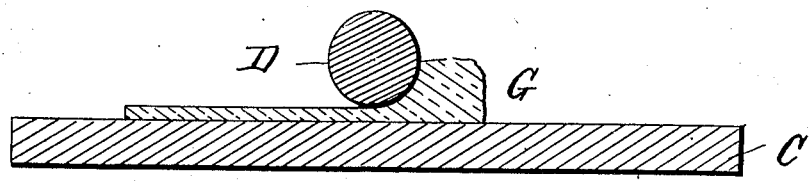
Figure 2:
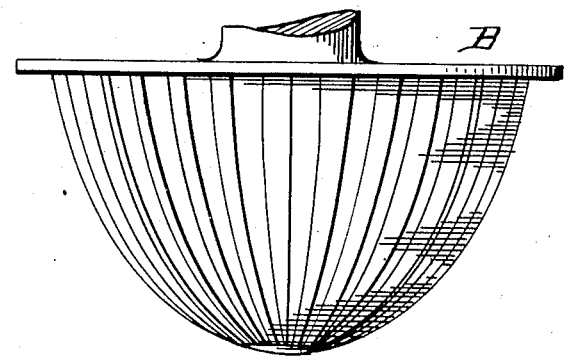
Figure 3:
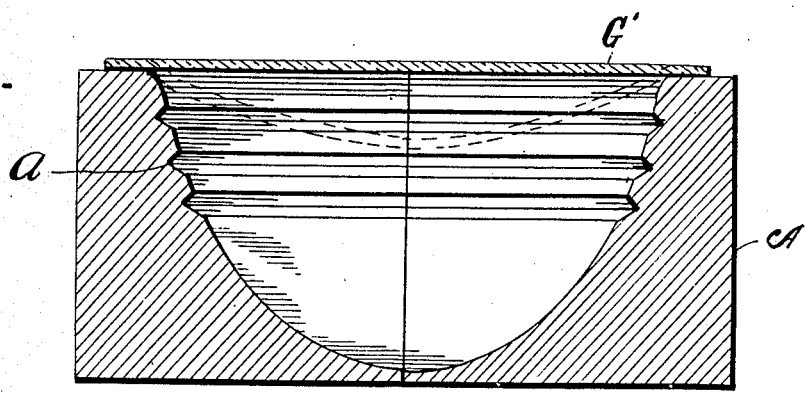
Figure 4:
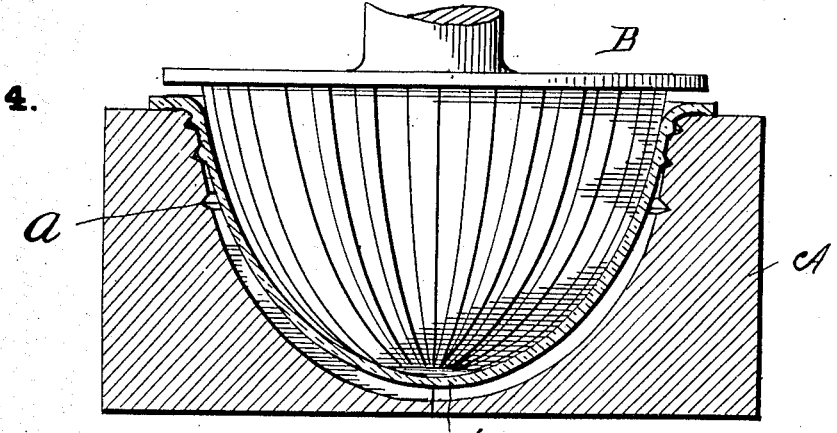

Figure 1 is a section of a rolling bed and roller, with a batch of plastic material on the bed. Fig. 2 is a broken elevation of a plunger, such as may be employed in a glass mold. Fig. 3 is a vertical section of a mold, with which the plunger of Fig. 2 is supposed to be employed, showing plastic plate over mouth of mold. Fig. 4 is a section of mold and plunger, showing mode of operation on the plastic sheet of glass.

The figures are merely diagrams supposed to assist in explaining the invention to persons skilled in the art, and are not intended to represent precise structures or proportions.

Heretofore, in pressing glass in molds, it has been usual to place an irregular mass of hot, plastic glass in a mold, and press the same to form by the action of a plunger. The mass of glass, found by guess or by weight to be sufficient for the purpose, has been placed in the bottom of a mold, say mold A, and when plunger B is brought down into the mold, the plastic mass is under pressure, and flows into the space between the plunger and mold. As the central part of the plunger first encounters the glass, and presses the same outwardly, a considerable part of the hot plastic glass is compelled to flow nearly the whole distance from the center to the extreme edge of the mold. The mold and plunger have a tendency to cool the glass and it becomes less plastic as it grows cooler. Thus most molded articles are thickest at about the part first exposed to the plunger action, and the article, having been molded at uneven temperatures, is subject to internal strains. More glass is used for most articles than is desirable, and the glass when partially cool, away from the center of the mold, is not capable of flowing so completely into fine depressions in the mold, thus giving poor "definition". I overcome these objections and difficulties to a great extent as follows: Taking a mass of plastic glass, G, found by weight or otherwise to be sufficient for the purpose of producing the desired article, the same is placed on a molding table C, preferably of carbon, and the mass is rolled out by a roller, as D, to such form and size as the mold makes necessary. For convenience and economy, the rolled sheet will generally approximate the diameter of the article to be molded. The sheet G' so rolled out, is placed over the mouth of the mold, as in Fig. 3. It will generally immediately sag, of its own weight, and in course of so sagging the material will flow or be drawn to some extent away from the center, that part of the sheet becoming thinner. The plunger B is immediately brought down on the sheet, acting in this case in nearly the same direction that gravity acts, to impel the material to and into the mold. The material of the sheet has but a short distance to flow under the pressure of the plunger, to reach the sides of the mold, and any depressions in the mold, such, for instance, as are indicated at *a*. A much thinner article can be so molded, and one having better "definition" of fine or ornamental lines, than in glassware molded in the usual way.

The plunger B may have its surface ribbed or otherwise formed in any way which will permit the withdrawal of the plunger and delivery of the article from the mold, and any known form of plunger, such as a collapsible plunger may be used.

While I have described the action of the plunger as being in downward direction, this is not necessary, as it is obvious that a substantially similar result will be reached if the mold and plunger are inverted. In either case the plunger will begin to act by its central portion, and the flow of the glass within the mass will be to a less distance if first reduced to approximately sheet form before pressing by a plunger, into a mold.

It has been common heretofore to form a plate of hot plastic glass, and then to force or expand the same into a mold by air pressure. In such case the air will force the sheet into depressions in the mold by elastic pressure, leaving a similar depression in the interior of the vessel, and never producing sharp and well defined surfaces on the glass, such as must follow from the pressure of a rigid instead of an elastic plunger.

What I claim is:

The herein described method which consists in rolling a mass of hot glass to a sheet approximately the size of the article to be produced, then placing it over a cavity mold, then sagging the hot sheet by gravity to draw the material away from the central portion, then compressing the glass sheet by a plunger into its final form.

In testimony whereof I affix my signature in presence of two witnesses.

OTIS A. MYGATT.

Witnesses:
S. W. FERGUSON,
W. A. DOREY.